(12) United States Patent  
Nelakonda et al.

(10) Patent No.: US 8,345,603 B2
(45) Date of Patent: Jan. 1, 2013

(54) METHOD AND APPARATUS FOR PROCESSING GTP TRIGGERED MESSAGES

(75) Inventors: Sathyender Nelakonda, Saratoga, CA (US); Suresh Kannan Durai Samy, Sunnyvale, CA (US); Himanshu Shah, Milpitas, CA (US)

(73) Assignee: Alcatel Lucent, Paris (FR)

( * ) Notice: Subject to any disclaimer, the term of this patent is extended or adjusted under 35 U.S.C. 154(b) by 236 days.

(21) Appl. No.: 12/894,570

(22) Filed: Sep. 30, 2010

(65) Prior Publication Data

US 2012/0082089 A1   Apr. 5, 2012

(51) Int. Cl.
*H04W 4/00* (2009.01)
(52) U.S. Cl. .................. 370/328; 370/329; 370/389
(58) Field of Classification Search .................. 370/328, 370/329, 389
See application file for complete search history.

(56) References Cited

U.S. PATENT DOCUMENTS

| 2003/0013446 | A1* | 1/2003 | Haumont et al. | 455/436 |
| 2007/0213060 | A1* | 9/2007 | Shaheen | 455/436 |
| 2009/0016334 | A1* | 1/2009 | Forsberg et al. | 370/389 |
| 2010/0103857 | A1* | 4/2010 | Ulupinar et al. | 370/313 |
| 2010/0103861 | A1* | 4/2010 | Ulupinar et al. | 370/315 |
| 2012/0071168 | A1* | 3/2012 | Tomici et al. | 455/445 |

* cited by examiner

*Primary Examiner* — Kenny Lin
(74) *Attorney, Agent, or Firm* — Wall & Tong, LLP (57) ABSTRACT

A GTP Triggered Message handling capability is provided for enabling handling of GTP Triggered Messages. A GTP Triggered Message including a GTP Sequence Number and an invalid TEID is received, and one of a plurality of processing elements is selected for the GTP Triggered Message based on the GTP Sequence Number of the GTP Triggered Message. The selected one of the processing elements is selected based on a mapping of a group of GTP Sequence Numbers to the selected one of the processing elements. The GTP Triggered Message is propagated toward the selected processing element such that the GTP Triggered Message may be processed by the selected processing element. In this manner, processing of GTP Triggered Messages having invalid TEIDs may be performed by processing elements which typically process GTP Triggered Messages having valid TEIDs, such that GTP Triggered Messages having invalid TEIDs are not required to be processed by a central processing module before being provided to the processing elements.

20 Claims, 5 Drawing Sheets

METHOD AND APPARATUS FOR PROCESSING GTP TRIGGERED MESSAGES

FIELD OF THE INVENTION

The invention relates generally to communication networks and, more specifically but not exclusively, to processing General Packet Radio Service (GPRS) Tunneling Protocol (GTP) Messages.

BACKGROUND

General Packet Radio Service (GPRS) Tunneling Protocol (GTP) is a group of Internet Protocol (IP)-based communications protocols that are used to carry GPRS within Global System for Mobile (GSM) and Universal Mobile Telecommunication Service (UMTS) networks, including Long Term Evolution (LTE) networks.

In such networks, different variants of GTP may be implemented by the various network elements of the networks. For example, different variants of GTP may be implemented by Radio Network Controllers (RNCs), Serving GPRS Support Nodes (SGSNs), Gateway GPRS Support Nodes (GGSNs), Serving Gateways (SGWs), Packet Data Network (PDN) Gateways (PGWs), xGWs (e.g., nodes supporting one or both of Serving Gateway (SGVV) and Packet Data Network (PDN) Gateway (PGW) capabilities), Charging Gateway Functions (CGFs), and the like.

There are several variants of GTP, including: GTP Control (GTP-C), GTP User Data Tunneling (GTP-U), and GTP prime (GTP').

GTP-C is used within the GPRS Core Network for signaling between GGSNs/PGWs and SGSNs/SGWs. This allows the SGSN/SGW to activate sessions on behalf of users (e.g., PDP context activation), to deactivate sessions on behalf of users, to update a session for a user who has just arrived from another SGSN/SGW, to adjust quality-of-service parameters, and the like.

GTP-U is used for carrying user data within the GPRS Core Network and between the GPRS Radio Access Network and the GPRS Core Network. The user data that is transported can be packets in any of IP version 4 (IPv4), IP version 6 (IPv6), or Point-to-Point Protocol (PPP) formats.

GTP is used for carrying charging data from the Charging Data Function (CDF) of the GSM or UMTS network to the Charging Gateway Function (CGF). In most cases, this should mean from many individual network elements, such as the GGSNs, to a centralized computer that delivers the charging data more conveniently to the billing center of the network operator.

GTP-C, GTP-U and GTP use a common message structure for performing their various functions.

In general, GTP Messages may be broken down into two categories as follows: GTP Initial Messages and GTP Triggered Messages.

GTP Initial Messages are messages originated by a GTP entity not based on any other GTP Message. For example, GTP Initial Messages include messages such as the Create Session Request message, the Modify Bearer Request message, the Bearer Resource Command message, the Modify Bearer Command message, and the like.

GTP Triggered Messages are messages that are generated as a result of a received GTP Message (e.g., such as a GTP Initial Message). For example, GTP Triggered Messages include messages such as the Create Session Response message, the Create Bearer Response message, the Create Bearer Request Modify Bearer Command message, the Update Bearer Request—in response to Modify Bearer Command message, and the like.

GTPv2 has been developed for use with evolved packet services. GTPv2 uses sequence numbers as transaction identifiers. The sequence numbers are used to correlate the response messages with the corresponding request messages. The response messages have the same sequence number as those of the corresponding request messages that triggered them. Typically, the GTP Messages (i.e., request and response) triggered by a GTP command have the same sequence number as that of the GTP command, and the sequence numbers used for the GTP commands have the most significant bit set (as do the request and response messages triggered by that command). Typically, the GTP Messages not triggered by the GTP commands do not have the most significant bit set (in order to avoid potential sequence number clashes). The sequence numbers for all outstanding transactions with a GTP peer are unique, and they are not reused until those transactions are completed, plus a time interval which is used to ensure that delayed request or response messages, if any, do not cause any issues.

In many implementations of nodes configured for processing GTP Messages, the node includes a central processing module (CPM) and multiple processing entities. The CPM is configured for receiving GTP Messages and providing them to the processing entities to be processed, and the processing entities are configured for processing the GTP Messages. In this sense, the control plane is distributed (e.g., possibly across multiple cards within a chassis and/or multiple tasks within the cards). In existing nodes, all incoming GTP Messages received at a node are routed to the appropriate processing entity of the node based on a value of the Tunnel Endpoint Identifier (TEID) in the GTP message header of the GTP Message, with the exception of incoming GTP Messages having an invalid TEID (e.g., unknown TEID value or a TEID value of zero) in the GTP message header, which are processed at the CPM. For example, an incoming Create Session Request (e.g., INITIAL_ATTACH at SGW or PDN_CONNECTION_REQUEST at PGW) with a TEID value of zero is processed at the CPM, and is then redirected to one of the processing entities based on various load-balancing considerations.

This process works well for GTP Initial Messages, and for most GTP Triggered Messages (which typically have a non-zero value of TEID which allows them to be routed to the appropriate processing entity). However, in some cases, when the GTP entity generating a GTP Triggered Message loses context of the session, the GTP entity, not knowing what to do with the GTP Triggered Message, sends an error message with a cause code of "Context Not Found" and a TEID value of zero (0). Similarly, in some cases, when the GTP entity generating a GTP Triggered Message loses context of the session, the TEID value included within the GTP Triggered Message is unknown or otherwise invalid. In such cases, it is not possible for the CPM of the node that receives the GTP Triggered Message to route the GTP Triggered Message to the appropriate processing entity based on the TEID. As a result, the CPM must process the GTP Triggered Message. This may lead to a condition in which the CPM is unduly burdened by processing of such messages (e.g., when too many "lost context" GTP Triggered Messages are received), such that the GTP Triggered Messages are not processed properly or timely and/or such that other CPM processing tasks are neglected.

SUMMARY

Various deficiencies in the prior art are addressed by embodiments for handling GTP Triggered Messages having invalid Tunnel Endpoint Identifiers (TEIDs).

In one embodiment, a method includes receiving a GTP Triggered Message including a GTP Sequence Number and an invalid TEID, and selecting one of a plurality of processing elements for the GTP Triggered Message based on the GTP Sequence Number of the GTP Triggered Message.

In one embodiment, an apparatus includes a processor configured for receiving a GTP Triggered Message including a GTP Sequence Number and an invalid TEID, and selecting one of a plurality of processing elements for the GTP Triggered Message based on the GTP Sequence Number of the GTP Triggered Message.

In one embodiment, a computer readable storage medium stores instructions which, when executed by a processor, cause the processor to perform a method that includes receiving a GTP Triggered Message including a GTP Sequence Number and an invalid TEID, and selecting one of a plurality of processing elements for the GTP Triggered Message based on the GTP Sequence Number of the GTP Triggered Message.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A GTP Triggered Message handling capability is depicted and described herein for enabling handling of General Packet Radio Service (GPRS) Tunneling Protocol (GTP) Messages.

The GTP Triggered Message handling capability, in a node having a central processing module (CPM) and a plurality of processing elements or entities, enables processing of GTP Triggered Messages (including GTP Triggered Messages having invalid Tunnel Endpoint Identifier (TEID) data) to be performed by the processing elements/entities of the node, as opposed to existing nodes in which processing of GTP Triggered Messages having invalid TEID data is performed by the CPMs of the nodes.

Although primarily depicted and described herein with respect to an embodiment in which the GTP Triggered Message handling capability is provided within a service router providing an xGW capability (e.g., one or both of Serving Gateway (SGW) and Packet Data Network (PDN) Gateway (PGW) capabilities), it will be appreciated that the GTP Triggered Message handling capability may be adapted for use in various other types of network elements which may process GTP Triggered Messages.

Figure 1:
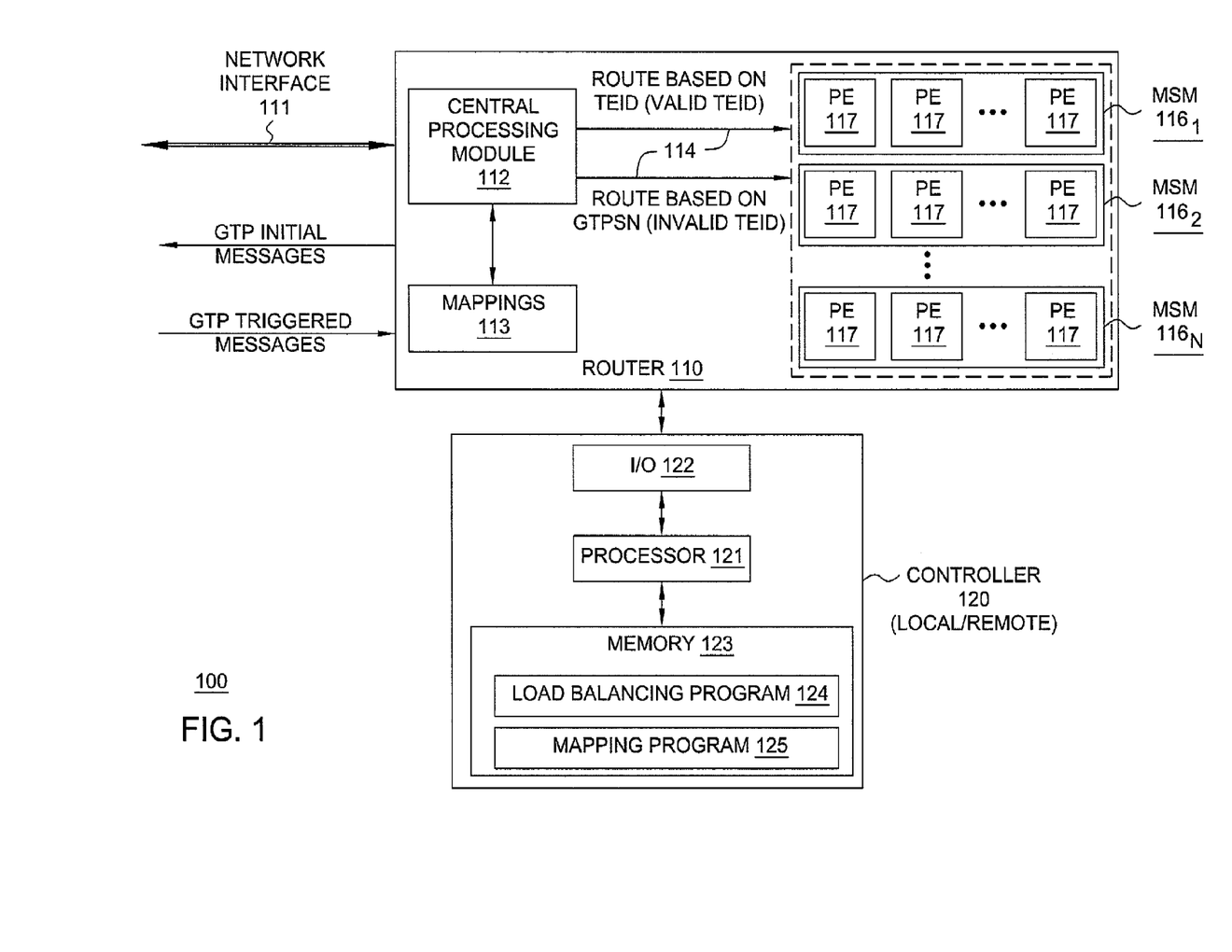
FIG. 1 depicts a high-level block diagram of a system including an exemplary router supporting an xGW implementation.

FIG. 1 depicts a high-level block diagram of a system including an exemplary router supporting an xGW implementation.

As depicted in FIG. 1, system 100 includes an exemplary router 110 and a controller 120.

The exemplary router 110 may support one or more of a PGW function, an SGW function, and like functions which may be supported by routers within GSM and UMTS networks.

The exemplary router 110 includes a network interface 111 via which the exemplary router may communicate with other devices, which may include peer and non-peer devices. Although depicted as having a single network interface 111, it will be appreciated that exemplary router 110 may include any suitable number of network interfaces.

As depicted in FIG. 1, exemplary router 110 may communicate via network interface 111 using the GTP protocol which, as described herein, may include sending of GTP Initial Messages and receiving of GTP Triggered Messages.

The exemplary router 110 includes a central processing module (CPM) 112 in communication with each of a plurality of mobile service modules (MSMs) $116_1$-$116_N$ (collectively, MSMs 116), where each MSM 116 includes a respective plurality of processing elements or processing entities (PEs) 117.

The exemplary router 110 is configured for supporting communication via GTP Messages, including GTP Initial Messages and GTP Triggered Messages, using CPM 112 and MSMs 116. In general, the load associated with routing packets of traffic flows through exemplary router 110, including routing of GTP Messages, is distributed across the PEs 117 of MSMs 116, under control of management software that is controlling CPM 112.

The exemplary router 110 is configured for transmitting GTP Initial Messages to remote devices via network interface 111. The GTP Initial Messages may provoke the remote devices to return GTP Triggered Messages to exemplary router 110. The exemplary router 110 is configured for receiving GTP Triggered Messages via network interface 111.

As will be understood, and generally speaking, each GTP Message includes a GTP message header including a Tunnel Endpoint Identifier (TEID) and a GTP Sequence Number (GTPSN). Namely, each transaction associated with a session (in this case, the GTP Initial Message and associated GTP Triggered Message returned in response to the GTP Initial Message) will include a TEID value associated with the session, where the TEID is used to multiplex different connections within the same GTP tunnel. Similarly, each transaction associated with a session (again, in this case, the GTP Initial Message and the associated GTP Triggered Message returned in response to the GTP Initial Message) will include a GTPSN value adapted for use in matching the GTP Triggered Message to the GTP Initial Message.

The CPM 112 is configured for receiving GTP Triggered Messages and providing the received GTP Triggered Messages to the appropriate PEs 117 of the appropriate MSMs 116 to be processed, and each of the PEs 117 is configured for processing the GTP Triggered Messages that it receives from CPM 112.

The CPM 112 is configured, when the TEIDs in the GTP Triggered Messages are valid, to route the GTP Triggered Messages to PEs 117 based on the values of the TEIDs in the GTP Triggered Messages, respectively. This is depicted in FIG. 1 with respect to routing path 114 (illustratively, top routing path 114).

As described herein, however, some GTP Triggered Messages that are received at exemplary router 110 may include invalid TEID values. As used herein, the term "invalid TEID" encompasses any TEID that is not valid, which may include TEIDs having an unknown value, TEIDs having a value of zero (0), and/or any other invalid TEIDs. The inclusion of an invalid TEID within a GTP Triggered Message may be caused by a number of conditions, such as when a GTP entity generating a GTP Triggered Message loses context of the session and, thus, sends GTP Triggered Message having an invalid TEID. For example, such loss of context may occur in scaling scenarios (e.g., where packets are lost), when an entity does a local cleanup or reboots without properly informing its peers, and the like.

The CPM 112 is further configured for providing GTP Triggered Messages to PEs 117 even for GTP Triggered Messages having invalid TEIDs (which, as described above, is unlike the capabilities of existing nodes in which GTP Triggered Messages having invalid TEIDs are processed at the CPMs of the nodes, rather than at the PEs of the nodes).

In one embodiment, the CPM 112 is configured to provide GTP Triggered Messages having invalid TEs to PEs 117 using mappings of ranges of GTP Sequence Numbers (GTPSNs) to the PEs 117 of MSMs 116. This is depicted as mappings 113, which are accessible to CPM 112.

In one embodiment, the mappings 113 include a direct mapping of ranges of GTPSNs to the PEs 117. In one embodiment, for example, the GTPSNs are divided into a plurality of groups or ranges, each of which is then associated with one or more of the PEs 117 of MSMs 116.

In one embodiment, the mappings 113 include an indirect mapping of ranges of GTPSNs to the PEs 117. In one such embodiment, ranges of GTPSNs are associated with groups or ranges of TEIDs, each of which is then associated with one or more of the PEs 117 of MSMs 116. In one embodiment, for example, the GTPSNs are divided into a plurality of groups or ranges, each of which is then associated with one or more groups or ranges of TEIDs. The ranges of TEIDs may or may not already be associated with PEs 117 (e.g., such as where existing mappings of TEIDs to PEs 117 are used for routing of GTP Triggered Messages having valid TEIDs). For example, load for processing session related traffic flows may be distributed across a plurality of MSM, and their respective PEs, according to TEID, such that each MSM (and, optionally, each PE of each MSM) is assigned to perform processing for all sessions associated with TEIDs in its group or range of TEIDs, respectively. This type of load balancing allows a logical mapping of processing load that can be updated quickly in the event of a failure or maintenance event.

In such embodiments, with respect to an implementation in which exemplary router 110 uses a distributed control plane, it may be noted that, whereas use of 16 bit GTPSNs in GTP v1 may have resulted in a small range of GTPSNs available for direct or indirect mapping to PEs 117, this potential problem is eliminated with use of 24 bit GTPSNs in GTP v2. For example, in an implementation in which exemplary router 110 uses a distributed control plane, the control plane may be fully distributed across multiple cards within a chassis and multiple tasks within one or more of the cards, however, the control plane appears and behaves as a single node with respect to external entities with which the control plane communicates. In one such embodiment, in order to make sure that one PE does not reuse the GTPSNs already in use by a different PE, the GTPSN space is divided across the various PEs.

In this embodiment, the CPM 112, upon receiving a GTP Triggered Message having an invalid TEID, routes the GTP Triggered Message to the PE 117 that is associated with the GTPSN of the GTP Triggered Message as determined by CPM 112 using the mappings 113 (i.e., CPM 112 uses the GTPSN from the GTP Triggered Message to search the mappings 113 in order to identify which of the PEs 117 of which of the MSMs 116 to which to provide the GTP Triggered Message). More specifically, the CPM 112, upon receiving a GTP Triggered Message having an invalid TEID, examines the GTPSN of the GTP Triggered Message in order to identify which PE 117 of MSMs 116 is associated with the GTPSN group or range that includes the GTPSN of the GTP Triggered Message, and routes the GTP Triggered Message accordingly. This is depicted in FIG. 1 with respect to routing path 114 (illustratively, bottom routing path 114).

Although depicted and described with respect to an embodiment in which each MSM 116 includes a plurality of PEs 117, in other embodiments one or more of the MSMs 116 may include only one PE 117, in which case references herein to routing of GTP Triggered Messages to PEs 117 will be understood to indicate routing of GTP Triggered Messages to MSMs 116 and, optionally, PEs 117 of MSMs 116 where one or more of the MSMs 116 do include multiple PEs 117.

The configuration of CPM 112 in this manner provides improvements for routing of GTP Triggered Messages which have invalid TEIDs (e.g., such as when the GTP entity generating a GTP Triggered Message loses context of the session, not knowing what to do with the GTP Triggered Message, sends an error message with a cause code of "Context Not Found" and uses a TEID value of zero (0)). The configuration of CPM 112 in this manner also eliminates situations in which the CPM would otherwise be negatively impacted by additional processing required for processing GTP Triggered Messages having invalid TEIDs.

As depicted in FIG. 1, exemplary router 110 is controlled by a controller 120.

The controller 120 may be implemented in any manner suitable for enabling controller 120 to control exemplary router 110.

In one embodiment, the controller 120 may be a module integrated with exemplary router 110. In one such embodiment, for example, the controller 120 may be implemented as a portion of CPM 112 and/or CPM 112 may be implemented as a portion of controller 120.

In one embodiment, as depicted in FIG. 1, controller 120 may be a device external to exemplary router 110, which may be directly connected to the exemplary router 110 (e.g., via direct physical connection) or indirectly connected to the exemplary router 110 (e.g., via a network communication path). In one such embodiment, for example, controller 120 is a local or remote management system.

In one embodiment, for example, controller 120 includes a processor 121, input-output (I/O) circuitry 122, and a memory 123, where processor 121 is configured for communicating with I/O circuitry 122 and memory 123. The I/O circuitry 122 may be configured to support communication between the controller 120 and exemplary router 110. The memory 123 may store various programs and data configured for use by processor 121 in supporting routing of GTP Triggered Messages having invalid TEIDs as described herein. In one embodiment, for example, memory 123 stores a load balancing program 124, a mapping program 125, and/or any other program(s) suitable for handling GTP Triggered Messages having invalid TEIDs. In this embodiment, the load balancing program 124 and the mapping program 125 may be executed by controller 120 to control the operation of CPM 112 to perform load balancing and associated mapping operations and/or downloaded from controller 120 to exemplary router 110 for use by CPM 112 to perform load balancing and associated mapping operations.

It will be appreciated that control of exemplary router 110 by controller 120 may be implemented in any other suitable manner.

In one embodiment, exemplary router 110 is an Alcatel-Lucent 7750 service router, although, as described herein, the GTP Triggered Message handling capability may be implemented within any other suitable type of router or other device communicating using GTP.

Figure 2:
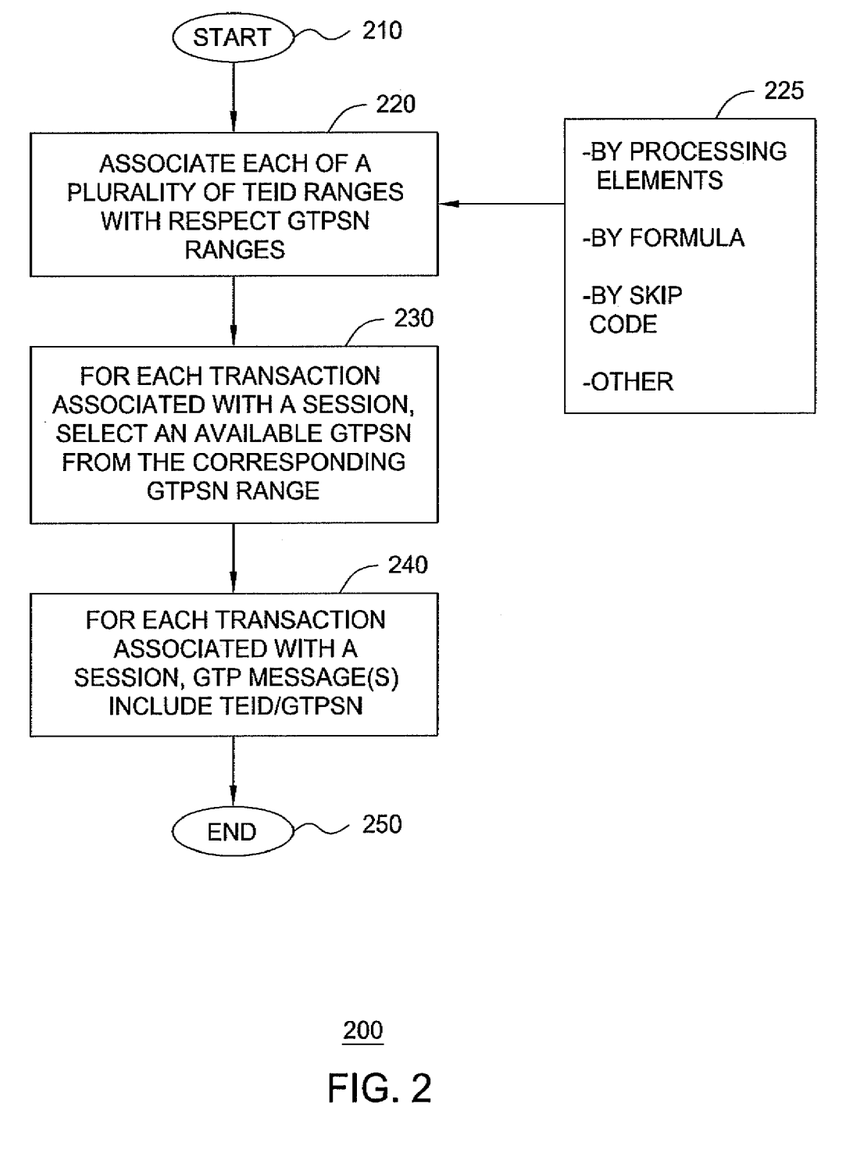
FIG. 2 depicts one embodiment of a method for routing a GTP Triggered Message within the exemplary router of FIG. 1.

FIG. 2 depicts one embodiment of a method for routing a GTP Triggered Message within the exemplary router of FIG. 1.

At step 210, method 200 begins.

At step 220, each of a plurality of TEID ranges is associated with a respective GTPSN range. As indicated by box 225, this association may be performed based on one or more of the PEs normally used for certain TEID ranges, a formula designed to provide an appropriate distribution, a skip code in which the actual TEID or GTPSN number maps to a particular PE, and/or one or more other suitable mechanisms. In this manner, the universe of TEIDs used by the system to identify sessions is divided into groups, where each group is associated with a particular range or group of GTPSNs.

At step 230, for each transaction associated with a session, an available GTPSN is selected from the corresponding range of GTPSNs associated with the TEID of the session.

At step 240, for each transaction associated with a session, the GTP Message(s) exchanged for the transaction use the associated TEID and GTPSN.

At step 250, method 200 ends.

Figure 3:
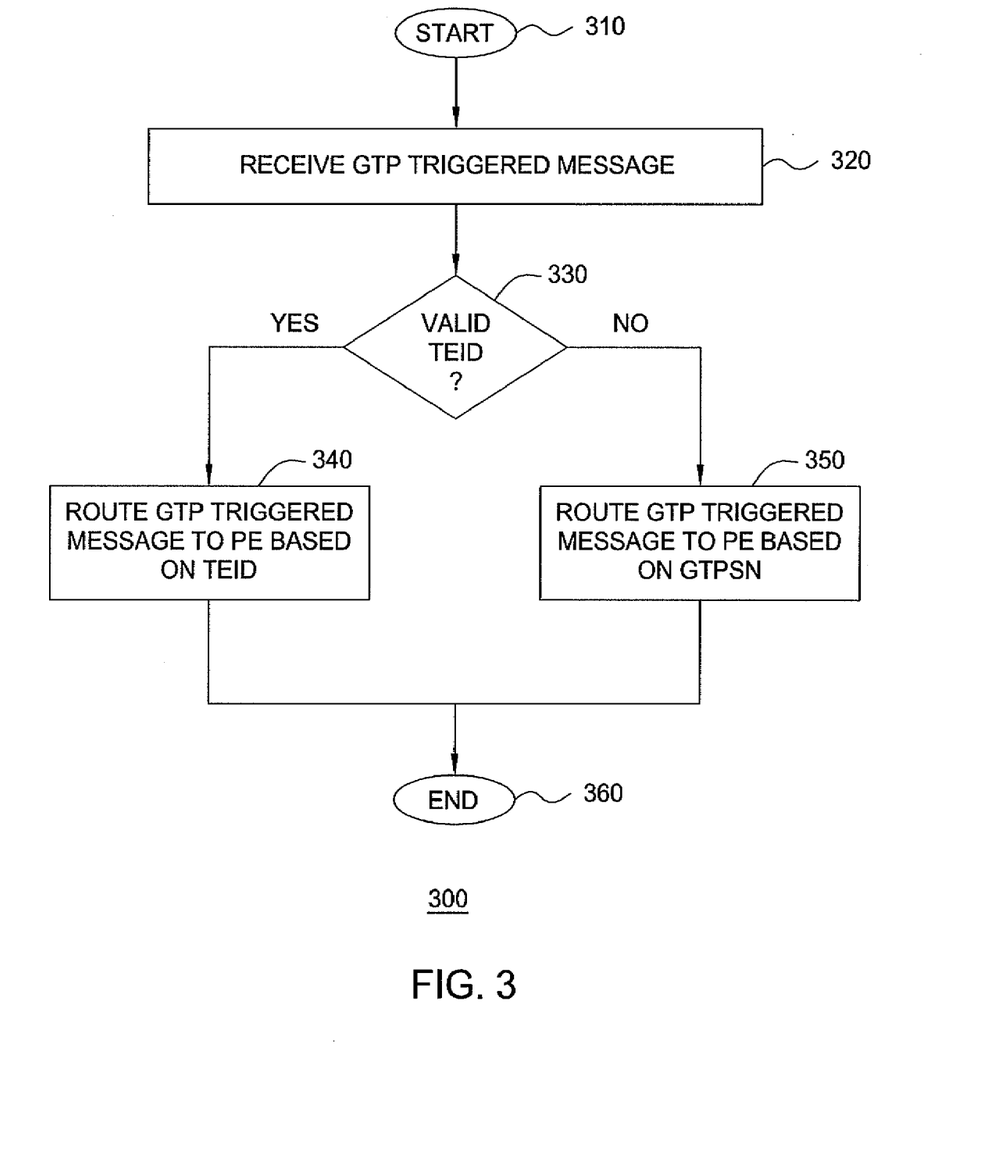
FIG. 3 depicts one embodiment of a method for routing a GTP Triggered Message within the exemplary router of FIG. 1.

FIG. 3 depicts one embodiment of a method for routing a GTP Triggered Message within the exemplary router of FIG. 1. The method 300 is executed by a CPM, upon receiving a GTP Triggered Message, for routing the GTP Triggered Message to one of a plurality of available PEs.

At step 310, method 300 begins.

At step 320, a GTP Triggered Message is received.

At step 330, a determination is made as to whether the GTP Triggered Message includes a valid TEID or an invalid TEID. If the GTP Triggered Message includes a valid TEID, method 300 proceeds to step 340. If the GTP Triggered Message includes an invalid TEID, method 300 proceeds to step 350.

At step 340, the GTP Triggered Message is routed to a PE based on the TEID of the GTP Triggered Message, i.e., to the MSM/PE associated with the TEID of the GTP Triggered Message.

At step 350, the GTP Triggered Message is routed to a PE based on the GTPSN of the GTP Triggered Message. This routing is performed using mappings of GTPSN groups/ranges to PEs. In one embodiment, for example, in which direct mappings are used, the GTPSN of the GTP Triggered Message is used to identify a GTPSN range/group, which is mapped to one of the MSMs/PEs. In one embodiment, for example, in which indirect mappings are used, the GTPSN of the GTP Triggered Message is used to identify a GTPSN range/group, which is mapped to a TEID range/group, which is in turn mapped to one of the MSMs/PEs. The use of such mappings for routing a GTP Triggered Message may be better understood by way of reference to the mappings 113 depicted and described with respect to FIG. 1.

At step 360, method 300 ends.

Figure 4:
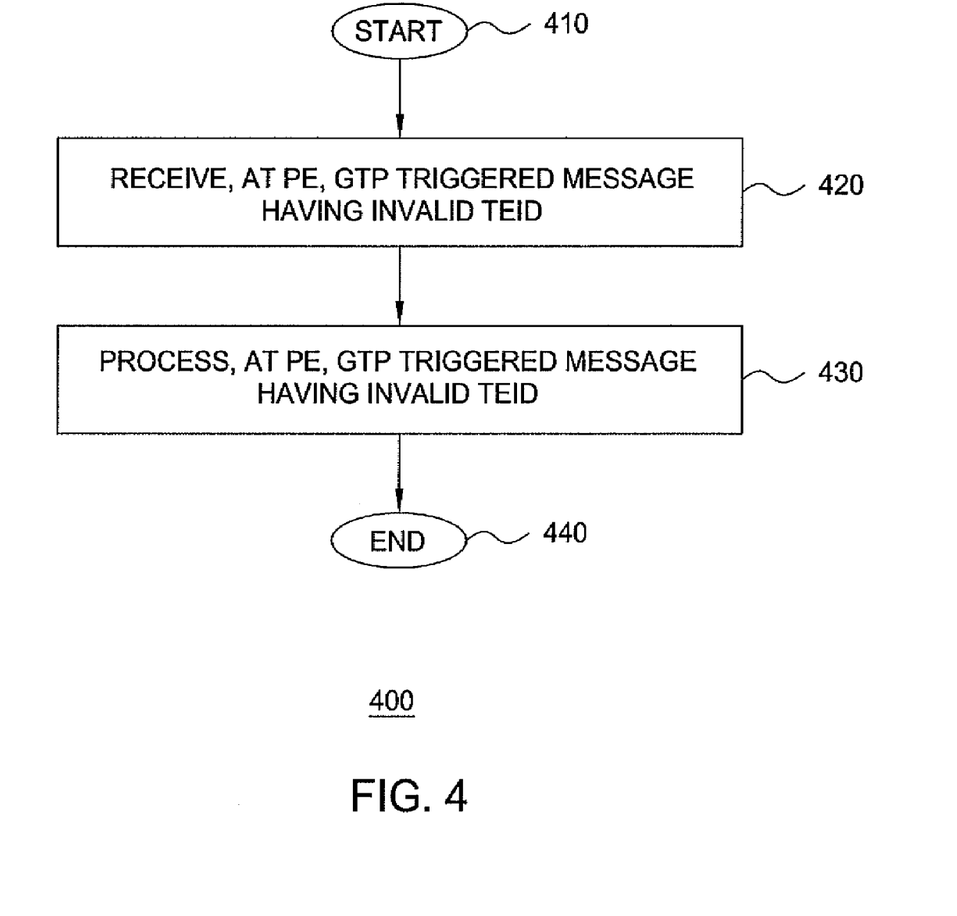
FIG. 4 depicts one embodiment of a method for processing a GTP Triggered Message within the exemplary router of FIG. 1.

FIG. 4 depicts one embodiment of a method for processing a GTP Triggered Message within the exemplary router of FIG. 1. The method 400 is executed by PE upon receiving a GTP Triggered Message.

At step 410, method 400 begins.

At step 420, a GTP Triggered Message is received at the PE. The GTP Triggered Message may include a valid TEID or an invalid TEID.

At step 430, the GTP Triggered Message is processed by the PE. The processing of a GTP Triggered Message by a PE will be understood by one skilled in the art.

At step 440, method 400 ends.

In various embodiments of the GTP Triggered Message handling capability, the various logical relationships (e.g., between the MSMs, the PEs of the MSMs, the TEID groups/ranges, and/or the GTPSN groups/ranges may be adapted in response to any suitable trigger condition (e.g., changes in load conditions, changes in service requirements, and the like, as well as various combinations thereof).

The various embodiments of the GTP Triggered Message handling capability advantageously reduce processor load on the CPM by providing a mechanism by which GTP Triggered Messages may be routed to appropriate MSMs/PEs in the event of invalid TEID information, where the mechanism includes the mapping of TEID groups/ranges and GTPSN groups/ranges in accordance with appropriate loading of MSMs and, optionally, PEs of MSMs.

The various embodiments of the GTP Triggered Message handling capability, by reducing CPM processing requirements and maintaining a mechanism to retain load balancing, ensure that routers and other types of devices processing GTP Messages are able to handle more traffic using the existing resources, thereby reducing bottleneck conditions which often occur within existing high-capacity mobile gateways.

The various embodiments of the GTP Triggered Message handling capability, in addition to providing such resource conservation, and in some cases as a result of providing such resource conservation, also improve speed in routing GTP Triggered Messages, improve various aspects of peer-to-peer communications, improve recovery from session context loss, and provide various other benefits and advantages.

Figure 5:
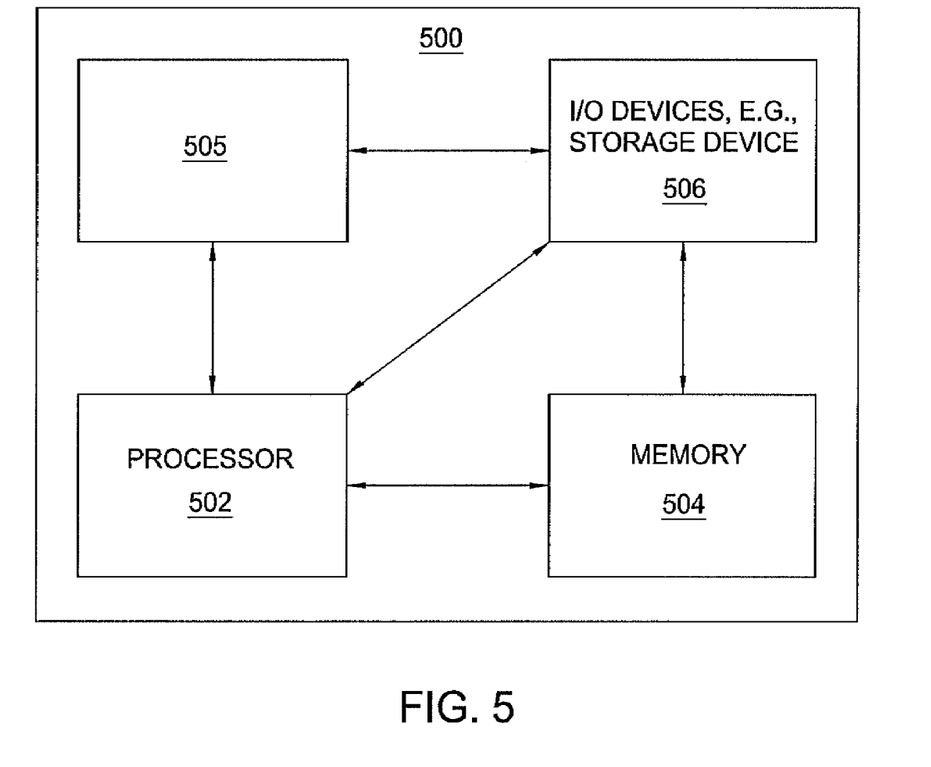
FIG. 5 depicts a high-level block diagram of a computer suitable for use in performing the functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 505 can be loaded into memory 504 and executed by processor 502 to implement the functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of exemplary router 110, one or more elements of exemplary router 110, controller 120, one or more elements of controller 120, and the like, as well as various combinations thereof.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for handling General Packet Radio Service (GPRS) Tunneling Protocol (GTP) Messages, comprising:
   receiving a GTP Triggered Message comprising a GTP Sequence Number and an invalid Tunnel Endpoint Identifier (TEID); and
   selecting one of a plurality of processing elements for the GTP Triggered Message based on the GTP Sequence Number of the GTP Triggered Message.

2. The method of claim 1, wherein the selected one of the processing elements is selected based on a mapping of a group of GTP Sequence Numbers to the selected one of the processing elements.

3. The method of claim 2, wherein the mapping of the group of GTP Sequence Numbers to the selected one of the processing elements is a direct mapping.

4. The method of claim 3, wherein selecting the one of the processing elements comprises:
   determining the GTP Sequence Number of the received GTP Triggered Message;
   identifying the group of GTP Sequence Numbers using the determined GTP Sequence Number; and
   identifying the processing element associated with the group of GTP Sequence Numbers.

5. The method of claim 2, wherein the mapping of the group of GTP Sequence Numbers to the selected one of the processing elements comprises:
   a first mapping part comprising a mapping of the group of GTP Sequence Numbers to a group of TEIDs; and
   a second mapping part comprising a mapping of the group of TEIDs to the selected one of the processing elements.

6. The method of claim 5, wherein selecting the one of the processing elements comprises:
   determining the GTP Sequence Number of the received GTP Triggered Message;
   identifying the group of GTP Sequence Numbers using the determined GTP Sequence Number;
   identifying, from the first mapping part, the group of TEIDs using the identified group of GTP Sequence Numbers; and
   identifying, from the second mapping part, the processing element associated with the group of TEIDs.

7. The method of claim 1, further comprising:
   propagating the GTP Triggered Message toward the selected processing element.

8. The method of claim 1, wherein the GTP Triggered Message is received by a central processing module (CPM), wherein the selected one of the processing elements is a processing element disposed on a mobile service module (MSM).

9. An apparatus for handling General Packet Radio Service (GPRS) Tunneling Protocol (GTP) Messages, comprising:
   a processor configured for:
      receiving a GTP Triggered Message comprising a GTP Sequence Number and an invalid Tunnel Endpoint Identifier (TEID); and
      selecting one of a plurality of processing elements for the GTP Triggered Message based on the GTP Sequence Number of the GTP Triggered Message.

10. The apparatus of claim 9, wherein the selected one of the processing elements is selected based on a mapping of a group of GTP Sequence Numbers to the selected one of the processing elements.

11. The apparatus of claim 10, wherein the mapping of the group of GTP Sequence Numbers to the selected one of the processing elements is a direct mapping.

12. The apparatus of claim 11, wherein selecting the one of the processing elements comprises:
   determining the GTP Sequence Number of the received GTP Triggered Message;
   identifying the group of GTP Sequence Numbers using the determined GTP Sequence Number; and
   identifying the processing element associated with the group of GTP Sequence Numbers.

13. The apparatus of claim 10, wherein the mapping of the group of GTP Sequence Numbers to the selected one of the processing elements comprises:
   a first mapping part comprising a mapping of the group of GTP Sequence Numbers to a group of TEIDs; and
   a second mapping part comprising a mapping of the group of TEIDs to the selected one of the processing elements.

14. The apparatus of claim 13, wherein selecting the one of the processing elements comprises:
   determining the GTP Sequence Number of the received GTP Triggered Message;
   identifying the group of GTP Sequence Numbers using the determined GTP Sequence Number;
   identifying, from the first mapping part, the group of TEIDs using the identified group of GTP Sequence Numbers; and
   identifying, from the second mapping part, the processing element associated with the group of TEIDs.

15. The apparatus of claim 9, wherein the processor is configured for:
   propagating the GTP Triggered Message toward the selected processing element.

16. The apparatus of claim 9, wherein the GTP Triggered Message is received by a central processing module (CPM), wherein the selected one of the processing elements is a processing element disposed on a mobile service module (MSM).

17. The apparatus of claim 9, further comprising:
   a memory configured for storing a mapping of a plurality of groups of GTP Sequence Numbers to a plurality of processing elements configured for processing GTP Triggered Messages.

18. A non-transitory computer readable storage medium storing instructions which, when executed by a processor, cause the processor to perform a method for handling General Packet Radio Service (GPRS) Tunneling Protocol (GTP) Messages, the method comprising:
- receiving a GTP Triggered Message comprising a GTP Sequence Number and an invalid Tunnel Endpoint Identifier (TEID); and
- selecting one of a plurality of processing elements for the GTP Triggered Message based on the GTP Sequence Number of the GTP Triggered Message.

19. The non-transitory computer readable storage medium of claim 18, wherein the selected one of the processing elements is selected based on a mapping of a group of GTP Sequence Numbers to the selected one of the processing elements.

20. The non-transitory computer readable storage medium of claim 19, wherein the mapping of the group of GTP Sequence Numbers to the selected one of the processing elements comprises at least one of:
- a direct mapping; and
- an indirect mapping comprising:
    - a first mapping part comprising a mapping of the group of GTP Sequence Numbers to a group of TEIDs; and
    - a second mapping part comprising a mapping of the group of TEIDs to the selected one of the processing elements.

* * * * *